(12) United States Patent
Ghosh

(10) Patent No.: US 7,731,368 B2
(45) Date of Patent: Jun. 8, 2010

(54) LAMP COOLING ARRANGEMENT FOR CINEMA PROJECTORS

(75) Inventor: Ashis Ranjan Ghosh, Cerritos, CA (US)

(73) Assignee: Christie Digital Systems USA, Inc., Cypress, CA (US)

( * ) Notice: Subject to any disclaimer, the term of this patent is extended or adjusted under 35 U.S.C. 154(b) by 782 days.

(21) Appl. No.: 11/532,282

(22) Filed: Sep. 15, 2006

(65) Prior Publication Data

US 2008/0123058 A1 May 29, 2008

(51) Int. Cl.
*G03B 21/18* (2006.01)
*G03B 21/16* (2006.01)
*F21V 29/00* (2006.01)
*F21V 7/20* (2006.01)

(52) U.S. Cl. .................. 353/60; 353/61; 362/345; 362/294

(58) Field of Classification Search .......... 353/60, 353/57, 58, 61; 348/748; 362/345, 294, 362/373, 243, 341, 247, 296.01, 327, 328, 362/218
See application file for complete search history.

(56) References Cited

U.S. PATENT DOCUMENTS

| | | | |
|---|---|---|---|
| 1,256,522 A | 2/1918 | Croxton | |
| 3,087,381 A | 4/1963 | Moffatt | |
| 3,639,751 A | 2/1972 | Pichel | |
| 4,460,939 A | 7/1984 | Murakami et al. | |
| 5,099,399 A | 3/1992 | Miller et al. | |
| 6,004,010 A | 12/1999 | Inage et al. | |
| 6,161,946 A | 12/2000 | Bishop et al. | |
| 6,227,682 B1 | 5/2001 | Li | |
| 7,018,076 B2 | 3/2006 | Pinho et al. | |
| 7,210,825 B2 * | 5/2007 | Watanabe et al. | 362/373 |
| 2003/0021120 A1 * | 1/2003 | Teichgraeber et al. | 362/294 |
| 2003/0076041 A1 * | 4/2003 | Honda et al. | 313/634 |
| 2003/0137640 A1 * | 7/2003 | Nakano et al. | 353/57 |
| 2003/0214617 A1 * | 11/2003 | Bierhuizen et al. | 349/113 |
| 2005/0117349 A1 * | 6/2005 | Pinho et al. | 362/345 |
| 2006/0279711 A1 * | 12/2006 | Yoshii et al. | 353/97 |

OTHER PUBLICATIONS

Demura, A.K. et al., Apr. 23, 1992, Copyright 2005 Derwent Information Ltd, (SU 1728573A) Abstract publication "Composite Reflector Lamp-" basic abstract and one figure.

* cited by examiner

*Primary Examiner*—Georgia Y Epps
*Assistant Examiner*—Ryan Howard
(74) *Attorney, Agent, or Firm*—Staas & Halsey LLP

(57) ABSTRACT

In a projector assembly having a lamp for emitting light, and an ellipsoid reflector for capturing the light, the ellipsoid reflector having an opening through its vertex facilitating placement of the lamp, there is provided an improvement wherein the opening in the ellipsoid reflector is sized to allow a major portion of cooling air to pass therethrough into a region defined by the ellipsoid reflector. An air deflector is situated in the opening so as to facilitate distribution of cooling air along the lamp and outwardly towards the inside surface of said ellipsoid reflector from within said region.

5 Claims, 5 Drawing Sheets

PRIOR ART

LAMP COOLING ARRANGEMENT FOR CINEMA PROJECTORS

FIELD OF THE INVENTION

The present invention relates to a cooling system for use with high performance reflectors and lamps in Film Projector Systems.

BACKGROUND OF THE INVENTION

High-end film projector systems typically use Xe bubble lamps coupled to an ellipsoid reflector. The reflected light is captured from the first focal point of the reflector and is re-imaged at the second focal point. The second focal point is commonly co-incident with an optics component such as an integrator rod, film projector lens, etc., depending on the implementation.

Reflectors used for lamps in the 1 to 6 KW range are typically made of metal (e.g. nickel deposit) or glass. Along with reflecting visible light, the reflectors also serve the purpose of removing infrared light generated by the lamp from the second focal point. This helps in reducing the amount of heating within the projector and is vital for projector performance. With metal reflectors this is accomplished by using IR absorbing coatings at the reflector surface. IR transmitting coatings tend to be used in glass reflectors. In either case, effective cooling must be applied to the reflector and the lamp for proper operation.

To that end, air is commonly directed onto the reflector surface, either directly or by the use of ducting, to maintain the reflector temperature and temperature gradient below a predetermined threshold above which damage can occur. In most cases air is forced onto the side of the reflector and ducting is used to re-distribute the air. This often results in areas of the reflector having high temperature gradients, resulting in local distortion and reduced coupling efficiency. Typically, for metal and glass reflectors operating with 6 KW lamps, up to 800 cfm of airflow is required for effective cooling. The lamp ends and bulb also need to be cooled. When air is used to cool the reflector from the side, effective cooling occurs for one lamp end. To cool the hub, air must be forced through the back opening of the reflector, over a first end of the bulb, over the center of the bulb and finally over the opposite end. However, air flow over the opposite end is usually too low for cooling. A second fan and/or complex extra ducting from the primary fan is therefore often used to provide cooling for the opposite lamp end.

U.S. Patent No. 7,018,076 to Christie Digital Systems, Inc. teaches a compound reflector that includes an air deflector that channels a portion of the air over and outside the ellipsoid reflector, and subsequently towards the opposite end of the lamp. There remains, however, a continual need to improve upon cooling systems for use with high performance Film Projector Systems.

Ensuring cost effective and efficient cooling of the reflector for high power Xe lamps (i.e. greater than 1 KW) remains a difficult challenge to projector and cooling system designers.

SUMMARY OF THE INVENTION

According to an aspect, in a projector assembly having a lamp for emitting light, and an ellipsoid reflector for capturing said light from a first focal point on the ellipsoid reflector and focusing said light at a second focal point co-incident with a further optics component, said ellipsoid reflector having a opening through its vertex facilitating placement of said lamp, there is provided an improvement comprising, said opening in said ellipsoid reflector being sized to allow a major portion of cooling air to pass therethrough into a region defined by said ellipsoid reflector; and an air deflector situated in said opening;

wherein said air deflector distributes cooling air along both the lamp and outwardly towards the inside surface of said ellipsoid reflector from within said region.

According to an other aspect, in a cinema projector having a lamp for emitting light, an ellipsoid reflector for capturing said light from a first focal point on the ellipsoid reflector and focusing said light at a second focal point co-incident with a further optics component, and a blower for introduction of cooling air, said ellipsoid reflector having a opening through its vertex facilitating placement of said lamp, there is provided an improvement comprising, said opening in said ellipsoid reflector being sized to permit a major portion of cooling air to pass therethrough into a region defined by said ellipsoid reflector;

an air deflector positioned in said opening; and an exhaust in the vicinity of said lamp within said region defined by said ellipsoid reflector;

wherein said air deflector distributes said major portion of cooling air passing through said opening along both said lamp and outwardly towards said ellipsoid reflector from within said region.

According to a further aspect, provided is a method of cooling a projector assembly having a lamp for emitting light, an ellipsoid reflector for capturing said light from a first focal point on the ellipsoid reflector and focusing said light at a second focal point co-incident with a further optics component, said ellipsoid reflector having a opening through its vertex facilitating placement of said lamp, the method comprising, directing a major portion of cooling air through said opening in said ellipsoid reflector, with a minor portion or said cooling air being directed towards the outside of said ellipsoid reflector;

directing at least a portion of said major portion of cooling air towards the inside surface of said ellipsoid reflector, the remaining portion of said major portion flowing along said lamp.

This together with other aspects and advantages that will be subsequently apparent reside in the details of construction and operation as more fully hereinafter described and claimed, reference being had to the accompanying drawings forming a part hereof, wherein like numerals refer to like parts throughout.

Advantageously, the cooling arrangement maintains cooler operating temperatures compared to prior art systems. By directing a major portion of the cooling air into the region defined by the ellipsoid reflector, the cooling air is in effect acting directly upon the 'hot zone' of the projector assembly. Prior art systems have not effectively cooled this region of the lamp, resulting in failure of the lamp and specialized coatings on the ellipsoid reflector. In addition, by directing a major portion of the cooling air into the region defined by the ellipsoid reflector, effective cooling of the far lamp end is achieved. Effective and efficient cooling of the lamp and ellipsoid reflector increases the lifespan of the components, increases the period of time between maintenance stoppages and generally decreases the number of stoppages required over the operational lifespan of the projector unit.

DESCRIPTION OF THE EMBODIMENTS

Figure 1:
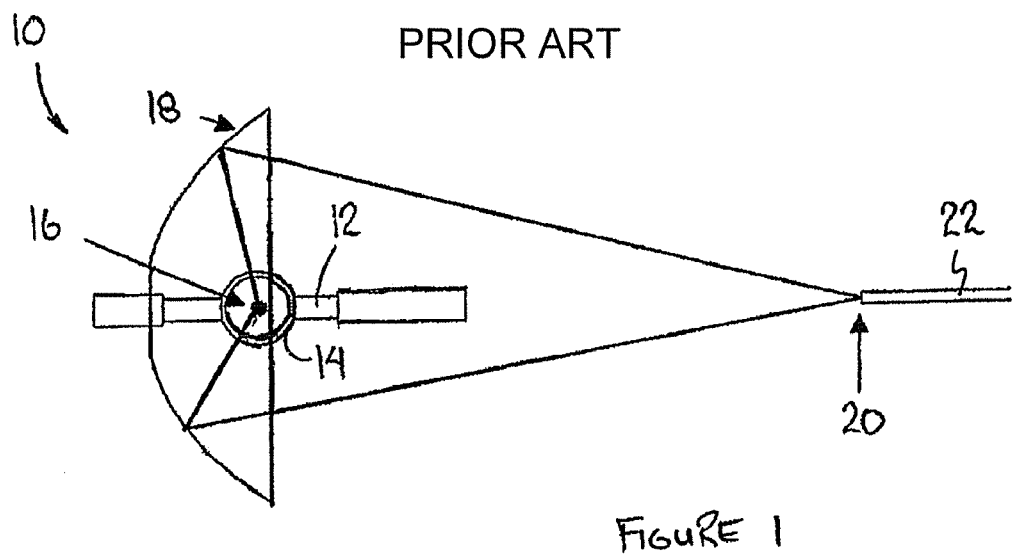
FIG. 1 is a schematic representation of an ellipsoid reflector and lamp for a projector according to the prior art.

FIG. 1 shows the general operating principle of a typical lamp projector 10. As shown, light is first generated by the lamp 12 having a bulb 14 located at a first focal point 16 of ellipsoid reflector 18. Light is then re-imaged at a second focal point 20 that is co-incident with a further optics component 22, such as a film projector lens or integrator rod.

Figure 2:
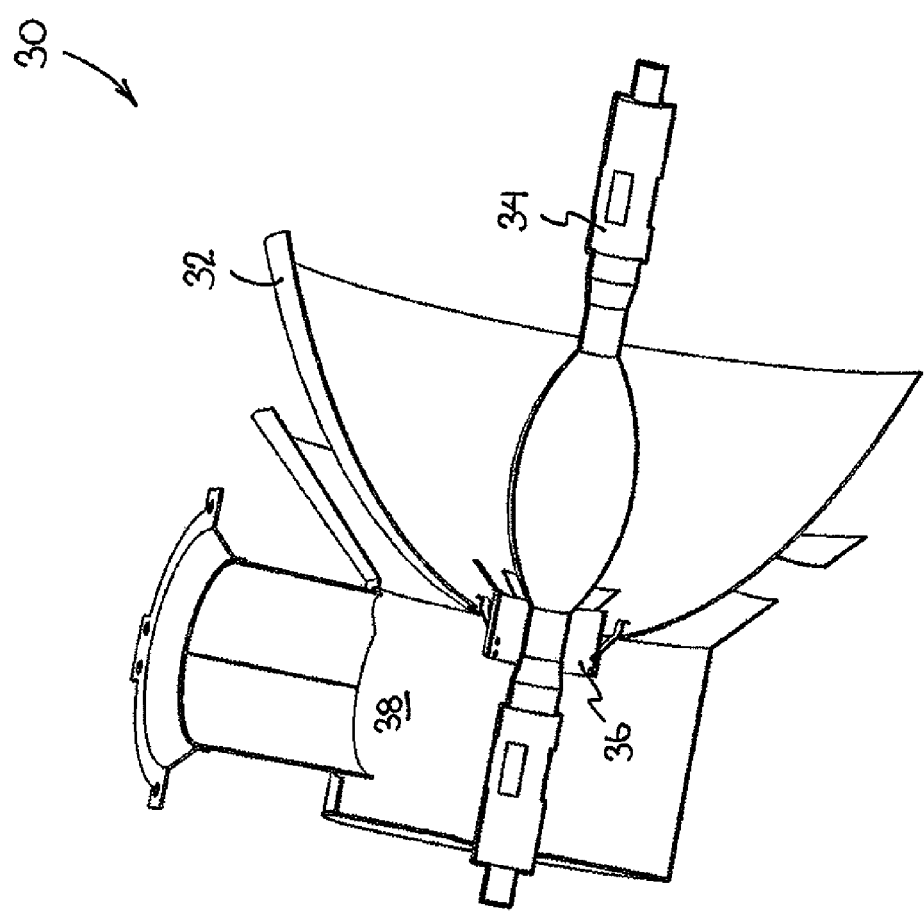
FIG. 2 is a partial sectional perspective view of an embodiment of the projector assembly of the present invention.
Figure 3:
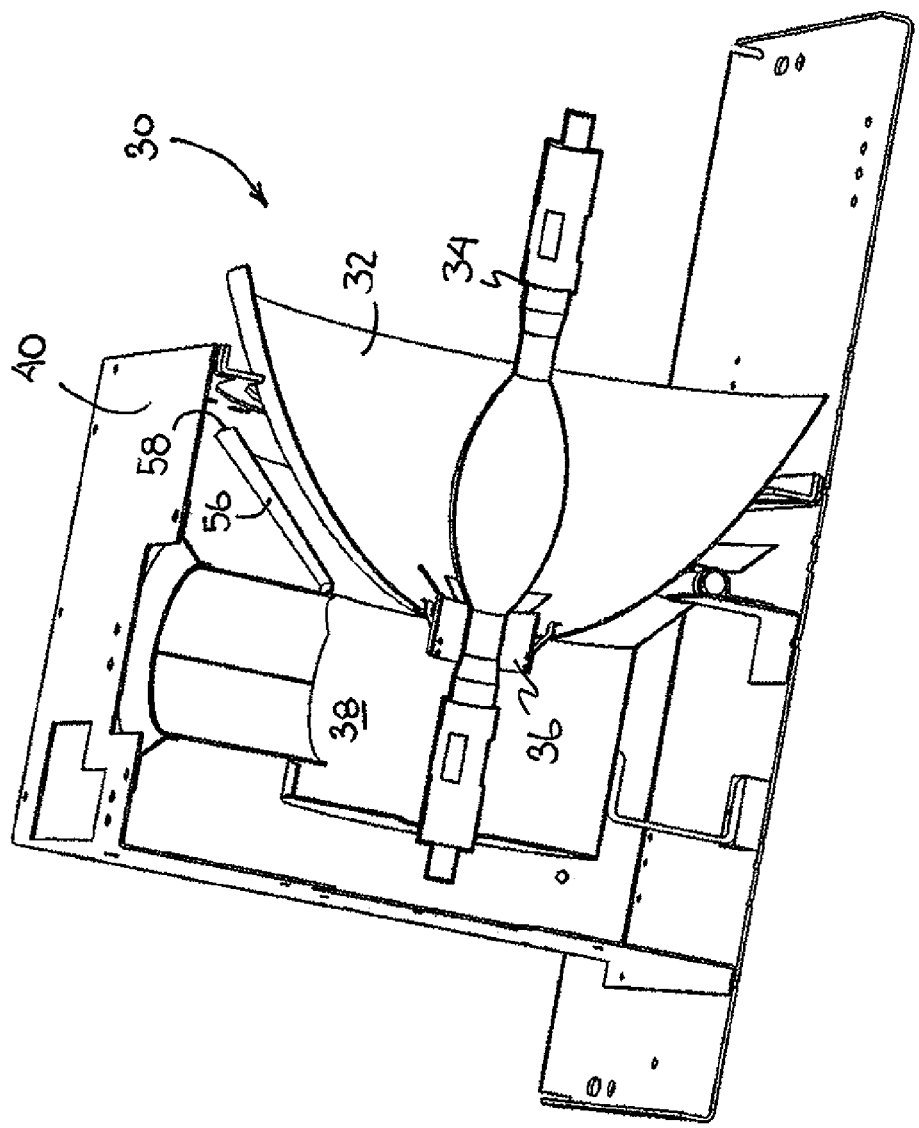
FIG. 3 is a partial sectional perspective view of the embodiment shown in FIG. 2 with the projector assembly mounted in a housing.
Figure 4:
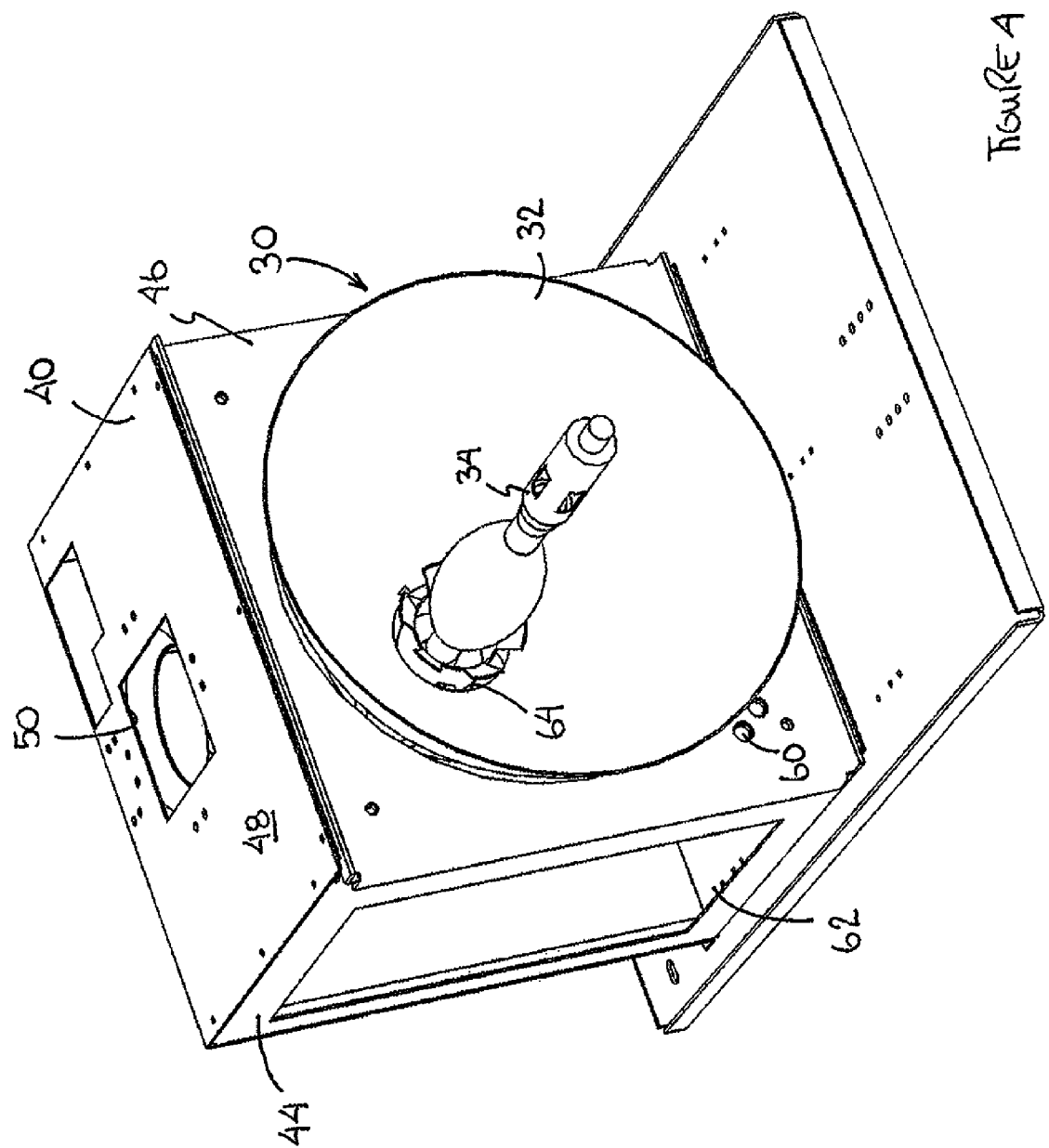
FIG. 4 is a perspective view of the embodiment shown in FIG. 2.
Figure 5:
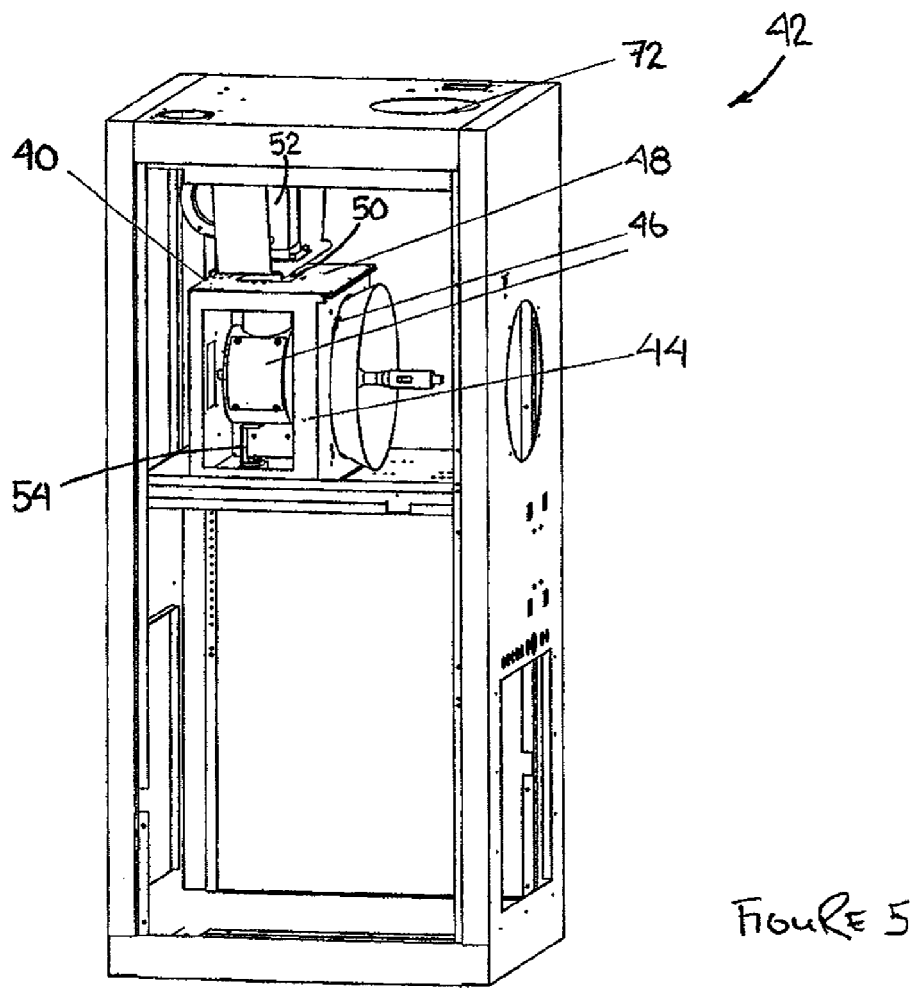
FIG. 5 is a perspective view of a cinema console containing the projector assembly shown in FIG. 2.

Referring now to FIG. 2, a projector assembly is indicated generally by the numeral 30. The projector assembly 30 includes an ellipsoid reflector 32, and a lamp 34, as well as a cooperating cooling assembly comprising an air deflector 36, and a main blower duct 38. In the present embodiment, the lamp 34 is a Xenon (Xe) lamp. As shown in FIGS. 3 and 4, the projector assembly 30 is mounted in a housing 40 that facilitates placement of the projector assembly into a projector console cabinet 42, as shown in FIG. 5.

The housing 40 includes a support frame 44, a reflector mounting plate 46 and a housing cover 48. As best shown in FIG. 4, the housing cover 48 is provided with an opening 50 to permit the entry of cooling air from a top-mounted blower 52. In the present embodiment, the top-mounted blower is mounted onto the console cabinet 42, with the output port of the blower 52 placed in close proximity to the opening 50 of the housing cover 48.

Mounting brackets 54 are used to retain the main blower duct 38 and associated projector assembly 30 in position relative to the housing 40. In particular, the main blower duct 38 is positioned such that the truncated conical shroud 56 has a terminal edge 58 spaced apart from the reflector mounting plate 46 by a predetermined amount (See FIG. 3). In the present embodiment, this predetermined amount is approximately 1 inch. This spacing facilitates the movement of a minor portion of the cooling air around the outside surface of the ellipsoid reflector 32. Cooling air circulating around the outside surface of the ellipsoid reflector 32 is ultimately discharged from this space through openings 60 provided on the reflector mounting plate 46 and through the access opening 62 of the support frame 44. The aforementioned predetermined spacing is chosen to reduce the possibility of a venturi effect that could potentially draw excess cooling air away from the central cooling path described below. In the present embodiment, the main blower duct receives cooling air from the top-mounted blower, and redirects this cooling air generally 90° towards the ellipsoid reflector. The main blower duct is generally sealed at the rear to facilitate directing the cooling air towards the ellipsoid reflector. The main blower duct is also provided with access ports and openings to accommodate and allow for maintenance of the lamp.

Figure 6:
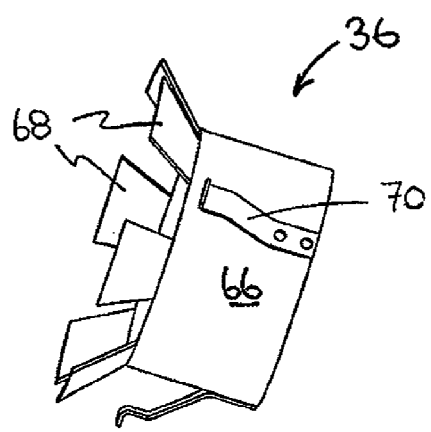
FIG. 6 is a perspective view of the air deflector of the embodiment shown in FIG. 2.

As shown in FIG. 4, the ellipsoid reflector 32 is provided with an opening 64 to accommodate the lamp 34. In general, the negative terminal of the lamp 34 is located towards the rear of the projector assembly, with the positive terminal located in the vicinity of the ellipsoid reflector 32. The longitudinal axis of the lamp 34 is generally coaxial with the theoretical vertex and longitudinal axis of the ellipsoid reflector 32. The air deflector 36 is positioned with the opening 64. The air deflector 36 is also generally coaxial with the theoretical vertex and longitudinal axis of the ellipsoid reflector 32. As shown in FIG. 6, the air deflector 36 includes a cylindrical body 66 and a plurality of angled guides 68 extending outwardly from one end. The air deflector 36 also includes suitable mounting gear (i.e. clips, brackets, etc.) 70 for positioning the air deflector 36 relative to the ellipsoid reflector 32. In the present embodiment, the angled guides 68 extend outwardly at an angle of 45° relative to the longitudinal axis defined by the cylindrical body 66 of the air deflector 36. The cylindrical body 66 of the air deflector 36 is provided with sufficient length so as to extend through the opening 64 of the ellipsoid reflector 32 in the direction of the inflow of cooling air through the main blower duct 38. The angled guides 68 flare outwards into the region of the ellipsoid reflector 32.

In general, the projector assembly 30 described herein directs a major portion (i.e. greater than 50%) of the cooling air through opening 64 into the area defined by the ellipsoid reflector 32. As indicated earlier, cooling air is also directed towards the outside of the ellipsoid reflector 32, but this represents a minor portion of the cooling air originating from the top-mounted blower 52.

The ellipsoid reflector 32, the air deflector 36 and the lamp 34 are sized and arranged so as to allow passage of cooling air both outside and inside of the air deflector 36. In this way, cooling air is able to take on a number of paths through the assembly, wherein as mentioned above, the majority of air originating from the blower 52 flows through the opening 64 into the area defined by the ellipsoid reflector 32. As shown, the air that flows inside the air deflector 36 is not subject to deflection and therefore continues onward in close proximity of the lamp 34. The air that passes outside of the air deflector 36 but between the plurality of angled guides 68 also flows in close proximity to the lamp 34. Cooling air that flows in this manner serves to cool the lamp as well as the far lamp end. Air that passes outside of the air deflector 36 but into one of the angled guides 68 is deflected outwardly into close proximity to the inside surface of the ellipsoid reflector 32. In this way, the cooling air that passes through opening 64 is distributed in a manner that provides a cooling effect to both the lamp 34 and the inside surface of the ellipsoid reflector 32. As such, the cooling system described here acts directly upon the 'hot zone' of the projector assembly, as opposed to indirect cooling offered by prior art systems.

As mentioned above, the projector assembly 30 is mounted in a housing 40 that in turn facilitates installation of the projector assembly 30 into a projector cabinet 42. As shown in FIG. 3, the projector cabinet 42 is provided with an exhaust port 72 that connects with a suitable blower for removing hot air from the projector cabinet 42. The rate of hot air removal is greater than the rate of introduction of cool air by the blower. As such, a partial vacuum is created in the vicinity of the lamp 34, facilitating the movement of cooling air through the opening 64 of the ellipsoid reflector 32. The positioning of the ellipsoid reflector 32 relative to the reflector mounting plate 46 is such that only a minimal amount of cooling air escapes between these structures, thereby increasing the amount of air passing through the opening 64 of the ellipsoid reflector 32.

In addition to the partial vacuum established by the exhaust blower, the constriction provided by the air deflector 36 establishes a venturi in the region of the opening 64 of the ellipsoid reflector 32. This venturi increases the rate air flow through the area, thereby having greater effect upon the removal of heat from the lamp 34 and surrounding area.

In test trials of the projector assembly described above, the ellipsoid reflector 32 and lamp 34 were effectively cooled. The test was conducted using a 6 KW Xenon lamp and an ellipsoid reflector having an IR suppressing dichroic cold coating (DCC), a coating with a maximum temperature allowance of 500° F. (260° C.). While prior art systems have attempted to maintain temperatures below this specified maximum, excess heat and subsequent coating failure is not uncommon. In the test trial, with a cooling blower flow of 407 CFM, an exhaust flow of 510 to 675 CFM, and an ellipsoid reflector opening of 3 inches, the maximum temperatures measured on the ellipsoid reflector remained at least about 60° F. below the maximum allowed temperature for the specified DCC coating. As such, with this cooling performance, failure of the ellipsoid reflector due to excess heat is far less likely, thereby increasing the lifespan of the unit.

Although embodiments of the invention have been described and illustrated in detail, various modifications and changes may be made. While preferred embodiments are described above, some of the features described above can be replaced or even omitted. For example, instead of mounting the cooling blower on the projector cabinet, it may be attached directly to the housing. The number of angled guides on the air deflector may be increased or decreased as necessary to effect a required distribution of cooling air. Still further alternatives and modifications may occur to those skilled in the art. All such alternatives and modifications are believed to be within the scope of the invention.

The invention claimed is:

1. In a projector assembly having a lamp for emitting light, and an ellipsoid reflector for capturing said light from a first focal point on the ellipsoid reflector and focusing said light at a second focal point co-incident with a further optics component, said ellipsoid reflector having a opening through its vertex facilitating placement of said lamp, the improvement comprising, said opening in said ellipsoid reflector being sized to allow a major portion of cooling air to pass therethrough into a region defined by said ellipsoid reflector, said major portion being greater than 50%; and an air deflector located in said opening;

wherein said air deflector distributes cooling air along both the lamp and outwardly towards the inside surface of said ellipsoid reflector from within said region, wherein said projector assembly further comprises a main cooling duct for directing cooling air towards said opening and wherein said main cooling duct has a truncated conical shroud surrounding at least a portion of said ellipsoid reflector for directing a minor portion of cooling air outside of said ellipsoid reflector.

2. The improvement of claim 1, wherein said air deflector comprises a plurality of angled guides for directing at least a portion of said cooling air in the direction of the ellipsoid reflector.

3. In a cinema projector having a lamp for emitting light, an ellipsoid reflector for capturing said light from a first focal point on the ellipsoid reflector and focusing said light at a second focal point co-incident with a further optics component, and a blower for introduction of cooling air, said ellipsoid reflector having a opening through its vertex facilitating placement of said lamp, the improvement comprising, said opening in said ellipsoid reflector being sized to permit a major portion of cooling air to pass therethrough into a region defined by said ellipsoid reflector, said major portion being greater than 50%;

an air deflector positioned in said opening; and an exhaust in the vicinity of said lamp within said region defined by said ellipsoid reflector;

wherein said air deflector distributes said major portion of cooling air passing through said opening along both said lamp and outwardly towards said ellipsoid reflector from within said region, and wherein said cinema projector further comprises a main cooling duct for directing cooling air towards said opening, and wherein said main cooling duct has a truncated conical shroud surrounding at least a portion of said ellipsoid reflector for directing a minor portion of cooling air outside of said ellipsoid reflector.

4. The improvement of claim 3, wherein said exhaust is configured to remove air at a rate greater than introduction of cooling air so as to create a partial vacuum in the vicinity of said region, said partial vacuum serving to assist in directing said major portion of cooling air through said opening.

5. The improvement of claim 3, wherein said air deflector comprises a plurality of angled guides for directing at least a portion of said cooling air in the direction of the ellipsoid reflector.

* * * * *